United States Patent Office 3,712,913
Patented Jan. 23, 1973

3,712,913
ALKENYLTHIOBENZOIC ACIDS
Madhukar Subraya Chodnekar, Basel, Albert Pfiffner and Norbert Rigassi, Arlesheim, Ulrich Schwieter, Reinach, Basel-Land, and Milos Suchy, Basel, Switzerland, assignors to Hoffmann-La Roche Inc., Nutley, N.J.
No Drawing. Filed Apr. 20, 1970, Ser. No. 30,296
Claims priority, application Switzerland, Apr. 30, 1969, 6,597/69
Int. Cl. C07c *149/40*
U.S. Cl. 260—470   12 Claims

ABSTRACT OF THE DISCLOSURE

Alkyl or alkenyl ethers or thioethers of benzene or benzyl derivatives wherein the alkyl or alkenyl radical contains a chain of eight or nine carbon atoms, which are useful in killing and preventing the proliferation of insects by upsetting their hormone balance.

SUMMARY OF THE INVENTION

In accordance with this invention it has been found that compounds of the formula:

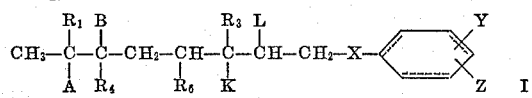

wherein $R_1$ is methyl or ethyl; $R_3$ is hydrogen, methyl or ethyl; $R_4$ is hydrogen or methyl; $R_6$ is hydrogen, or lower alkyl; K and L are individual hydrogen; A and B taken together form a carbon-to-carbon bond, an oxygen bridge or a sulfur bridge; K and L taken together form a carbon-to-carbon bond; X is thio, sulfinyl, sulfonyl,

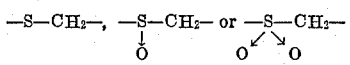

Y is individually hydrogen, halogen, lower alkyl or lower alkoxy; Z is carboxyl, lower alkoxycarbonyl, aryloxycarbonyl and aralkoxycarbonyl; and the dotted lines can be optionally hydrogenated;

upsetting the hormone balance of pests such as insects to prevent them from growing and reproducing.

The compounds of Formula I are prepared through the condensation of a halide of the formula:

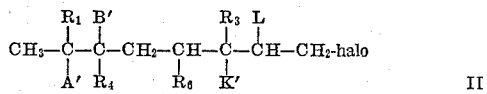

wherein $R_1$, $R_3$, $R_4$, and $R_6$ are as above; and K' and L are individually hydrogen; A' taken together with B' form a carbon-to-carbon bond, an oxygen bridge or a sulfur bridge; and K' taken together with L form a carbon-to-carbon bond;

with a compound of the formula:

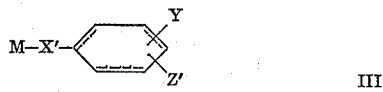

wherein M is a metal of Group I in the Periodic Table; X' is —S—, or —S—CH$_2$—; Y is as above; Z' is formyl, carboxyl, lower alkoxycarbonyl, aryloxycarbonyl, and aralkoxycarbonyl; and the dotted lines can be optionally hydrogenated.

DETAILED DESCRIPTION OF THE INVENTION

The term "halogen" as used throughout this application, includes all four halogens, i.e., bromine, chlorine, fluorine, and iodine. The preferred halogens are chlorine, bromine and fluorine. As used throughout this application, the term "lower alkyl" comprehends both straight and branched chain saturated hydrocarbon groups containing from 1 to 6 carbon atoms, such as methyl, ethyl, propyl, isopropyl, etc. The term "lower alkoxy" comprehends lower alkoxy groups containing from 1 to 6 carbon atoms such as methoxy, propoxy, ethoxy, etc.

The term "aryl," as used throughout the application, includes mononuclear aryl groups such as phenyl which can be unsubstituted or substituted in 1 or more positions with a hydroxy, methylenedioxy, halogen, nitro, lower alkyl or a lower alkoxy substituent, and polynuclear aryl groups such as naphthyl, anthryl, phenanthryl, azulyl, etc., which may be substituted with 1 or more of the aforementioned groups. The term "aryloxy carbonyl" comprehends aryloxy-carbonyl groups wherein the aryl moiety is defined as above. The preferred aryloxy carbonyl group is phenoxy-carbonyl. The term "aralkyloxy carbonyl" comprehends aralkoxy-carbonyl groups wherein aryl is defined as above and the alkyl is lower alkyl. The preferred aralkoxycarbonyl group is benzyloxycarbonyl. The term "alkoxycarbonyl" as utilized herein includes lower alkoxycarbonyl groups wherein lower alkoxy is defined as above. Among the preferred lower alkoxycarbonyl groups are included methoxycarbonyl, ethoxycarbonyl and isopropoxycarbonyl.

The compounds of Formula I are useful in the control of pests such as *Tineola biselliella* (clothes moth), *Ephestia kuhniella* (meal moth), *Dysdercus cingulatus* (cotton bug), *Blatella germanica* (cockroach).

In contrast to most of the know pest-control agents which kill, disable or repell the pests by acting as contact poisons and feed poisons, the compounds of Formula I above prevent maturation and proliferation of these pests by interfering with their hormonal system. In insects, for example, the formation into the imago, the laying of viable eggs and the development of laid normal eggs is disturbed. Furthermore, the sequence of generations is interrupted and the insects are indirectly killed.

The compounds of Formula I above are practically non-toxic to vertebrates. The toxicity of these compounds is greater than 1000 mg./kg. body weight. Moreover, these compounds are readily degraded and the risk of accumulation is therefore excluded. Therefore, these compounds can be used without fear of danger in the control of pests in animals, plants, foods and textiles.

Generally, in controlling invertebrate animals, the compounds of Formula I above thereof are applied to the material to be protected, e.g., foodstuffs, feeds, textiles, plants in concentrations of from about $10^{-3}$ to $10^{-8}$ gm./cm.$^2$ of the material to be protected. Generally, it is preferred to utilize the compounds of Formula I above in a composition with a suitable inert carrier. Any conventional inert carrier can be utilized.

The compound of Formula I can, for example, be used in the form of emulsions, suspensions, dusting agents, solutions or aerosols. In special cases, the materials to be protected (e.g., foodstuffs, seeds, textiles and the like) can also be directly impregnated with the appropriate compound or with a solution thereof. Moreover, the compounds can also be used in a form which only releases them by the action of external influences (e.g., contact with moisture) or in the animal body itself.

The compound of Formula I above can be used as solutions suitable for spraying on the material to be protected which can be prepared by dissolving or dispersing these compounds in a solvent such as mineral oil fractions; cold tar oils; oils of vegetable or animal origins; hydrocarbons such as naphthalenes; ketones such as methyl ethyl ketone; or chlorinated hydrocarbons such as tetrachloroethylene, tetrachlorobenzene, and the like. The compounds of Formula I above can also be prepared in forms suitable for dilution with water to form aqueous liquids such as, for example, emulsion concentrates, pastes or powders. The compounds of Formula I above can be combined with solid carriers for making dusting or strewing powders as, for example, talc, kaolin, bentonite, calcium carbonate, calcium phosphate, etc. The compositions containing the compound of Formula I above can contain, if desired, emulsifiers, dispersing agents, wetting agents, or other active substances such as fungicides, bacteriacides, nematocides, fertilizers and the like. These materials which are to be protected act as bait for the insect. In this manner, the insect, by contacting the material impregnated with the compound of Formula I above, also contacts the compound of Formula I above.

It will be appreciated from the foregoing that the invention also includes within its scope an agent useful for the control of pests which contains as an essential active ingredient or essential active ingredients one or more of the phenyl derivatives of Formula I in association with a compatible carrier material. In addition, the invention includes within its scope a method of rendering a locus subject to or subjected to attack by pests immune to or free from such attack, said method comprising applying to said locus an agent as hereinbefore defined or one or more of the phenyl derivatives of Formula I.

Among the preferred compounds of Formula I are included compounds of the formula:

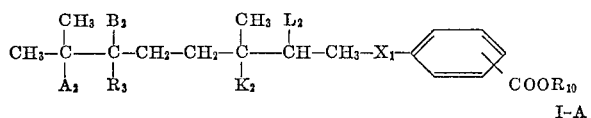

I-A wherein $X_1$ is thio or sulfinyl; $A_2$ and $B_2$ taken together for a carbon-to-carbon bond or an oxygen bridge; $K_2$ and $L_2$ taken together form a carbon-to-carbon double bond; $R_{10}$ is hydrogen, phenyl, phenyl-lower alkyl, preferably benzyl, and lower alkyl; $R_3$ is as above;

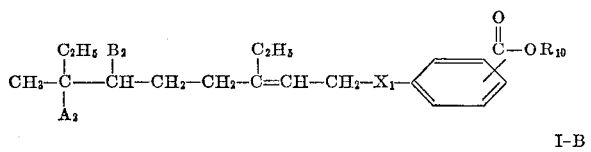

I-B wherein $A_2$, $B_2$, $X_1$ and $R_{10}$ are as above.

In accordance with a preferred embodiment of this invention $R_{10}$ in the compounds of Formulae I–A and I–B is lower alkyl, especially methyl and is substituted in the ortho or para positions.

Among the preferred compounds of Formula I above are included the following compounds:

p-[(3,7-dimethyl-octa-2,6-dienyl)-thio]-benzoic acid methylester;
p-[(6,7-epoxy-3,7-dimethyl-oct-2-enyl)-thio]-benzoic acid methylester;
p-[(trans-3,7-dimethyl-octa-2,6-dienyl)-sulfinyl]-benzoic acid methylester;
o-[3,7-dimethyl-octa-2,6-dienyl)-thio]-benzoic acid;
o-[3,7-dimethyl-octa-2,6-dienyl)-thio]-benzoic acid benzylester;
o-[(3,7-dimethyl-octa-2,6-dienyl)-sulfinyl]-benzoic acid benzylester;
p-[(3,6,7-trimethyl-octa-2,6-dienyl)-thio]-benzoic acid methylester; and
p-[(3,6,7-trimethyl-octa-2,6-dienyl)-sulfinyl]-benzoic acid methylester.

The halide starting materials of Formula II and the starting materials of Formula III are known substances and they can be reacted with each other to produce a compound of the Formula I above in accordance with methods known per se.

For example, a halide of Formula II preferably a chloride or bromide, is expediently dissolved in an inert organic solvent and the solution allowed to act on a compound of Formula III (formed in statu nascendi). The compound of Formula III (an alkali metal salt) can advantageously be formed by reacting the corresponding thiophenol or thioalcohol with an alkali metal hydride, alkali metal alcoholate or alkali metal hydroxide, preferably sodium hydride, a sodium acoholate or sodium hydroxide in a known manner. The salt formation and the reaction of the salt with the halide are expediently carried out in the presence of a suitable inert organic solvent. When sodium hydride is used, suitable solvents are, for example, dioxane, tetrahydrofuran, dimethylformamide or diethyl ether, when sodium methylate is used a suitable solvent is for example, methanol or when sodium hydroxide is used suitable solvents are for example, methanol, ethanol or acetone. The reaction of the halide with a thiophenol or thioalcohol can also be carried out in the presence of a carbonate, preferably potassium carbonate.

The reaction of a halide of Formula II with a compound of Formula III is expediently carried out at a temperature between 0° C. and the boiling temperature of the reaction mixture, advantageously in the presence of hexamethyl phosphoric acid triamide. The reaction mixture can be worked up in a conventional manner. For example, it can be poured onto ice and extracted with diethyl ether, the ether extract washed with water, dried and evaporated. The resulting derivative of Formula I can be purified by adsorption; for example, on Kieselgel or aluminum oxide.

When Z, in the compound of Formula I above is formyl, this compound can be oxidized to the corresponding acid in a known manner.

The oxidation of the formyl group can advantageously be carried out at room temperature with the aid of silver oxide formed in an aqueous medium from silver nitrate and sodium hydroxide. After the oxidation, the aqueous solution is extracted with diethyl ether and the ether extract is discarded. By acidification of the aqueous phase, the sodium salt present therein is converted into the free acid which can be extracted (e.g., with diethyl ether or methylene chloride) and isolated from the extract in a conventional manner.

When Z, in the compound of Formula I above is an acid group, the acid can be converted into an acid chloride by conventional means such as by treatment with thionyl chloride, preferably in the presence of pyridine. The acid halide can be transformed into an ester by reaction with an alcohol utilizing conventional procedures well known in the art.

If desired, the derivatives of Formula I in which A and B taken together and K and L taken together form a carbon-to-carbon bond can be epoxidized or episulfidized in accordance with methods known per se.

Thioethers obtained can be oxidized to the corresponding sulfinyl or sulfonyl derivatives by oxidation. Particularly suitable oxidizing agents are organic peracids, preferably m-chloroperbenzoic acid. The oxidation is advantageously carried out in an inert organic solvent, especially in methylene chloride, at a temperature between 0° C. and room temperature. If 1 mole of peracid is used for each mole of thioether, the corresponding sulfinyl derivative is obtained. If 2 moles of peracid are used for each mole of thioether, the corresponding sulfonyl derivative is obtained.

The epoxidation of derivatives of Formula I can expediently be carried out by dissolving the derivative concerned in an inert solvent (especially in a halogenated hydrocarbon such as methylene chloride or chloroform) and treating the solution obtained with an organic peracid (e.g., with perbenzoic acid, m-chloroperbenzoic acid or perphthalic acid) at a temperature between 0° C. and room temperature. Alternatively, the deriavtive concerned can be suspended in water and treated with an appropriate amount of an inert solvent (e.g., with dioxane, tetrahydrofuran or 1,2-dimethoxyethane) such that a homogenous concentrated solution is obtained. N-bromosuccinimide is then introduced portionwise into this solution at a temperature between 0° C. and room temperature. The resulting bromohydrin can be smoothly converted into the desired epoxide by the action of alkali, especially by the action of sodium methylate in methanol.

The introduction of a sulfur bridge into derivatives of Formula I can be effected in various way. If, for example, thiourea is allowed to act on a halohydrin (preferably on the bromohydrin) of a derivative of Formula I there is firstly formed an isothiouronium salt. This salt is also formed when thiourea is allowed to act on an epoxide of Formula I, a temperature of from 0 to 30° C. in the presence of a mineral acid. The isothiouronium salts obtained can be readily converted into the desired epithio derivatives of Formula I by treatment with a base.

Insofar as the side chain is unsaturated, the derivatives of Formula I are obtained according to the process as a cis/trans isomer mixture. The mixture can, for example, be separated into the individual isomeric forms by adsorption on a material having selective activity. For example, the isomer mixture can be dissolved in an inert organic solvent (e.g., in hexane, ether or acetic acid ethyl ether) and adsorbed on Kieselgel. The isomers adsorbed in different zones can be eluted with one of the solvents named hereinbefore or a mixture thereof and isolated. In individual cases, the isomer mixture can also be separated by fractional distillation or by fractional crystallization.

The following examples are illustrative but not limitative of this invention. In the examples the percent of hydride in the mineral oil is given as weight percent.

Example 1

In an inert gas atmosphere, 6.2 g. of a 50% suspension of sodium hydride in mineral oil are washed with two 50 ml. portions of tetrahydrofuran, introduced into 100 ml. of tetrahydrofuran, and treated dropwise with a solution of 24 g. of p-mercapto-benzoic acid methyl ester in 200 ml. of tetrahydrofuran. 27 g. of 1-bromo-3,7-dimethyl-octa-2,6-diene in 70 ml. of hexamethylphosphoric triamide are subsequently added dropwise and the resulting mixture is heated under reflux conditions for 2 hours, cooled, poured onto ice and exhaustively extracted with diethyl ether. The ether extract is washed with water, dried over sodium sulfate and evaporated under reduced pressure. The residual p-[(3,7-dimethyl-octa-2,6-dienyl) - thio]-benzoic acid methyl ester is purified by adsorption on Kieselgel; boiling point=182°–185° C./0.1 mm. Hg; $n_D^{24}$=1.5550.

Example 2

Utilizing the same procedure as in Example 1, o-mercaptobenzoic acid is reacted with 1-bromo-3,7-dimethyl-octa-2,6-diene to produce o-[(3,7-dimethyl-octa-2,6-dienyl) - thio] - benzoic acid (melting point=100°–101° C.); p-mercapto-benzoic acid methyl ester is reacted with 1-chloro-3,6,7-trimethyl-octa-2,6-diene to produce p]-3,6 7-trimethyl-octa-2,6-dienyl)-thio]-benzoic acid methyl ester (boiling point=210° C./0.1 mm. Hg; $n_D^{24}$=1.5510); and o-mercapto-benzoic acid benzyl ester is reacted with 1-bromo-3,7-dimethyl-octa-2,6-diene to produce o-[(3,7-dimethyl-octa-2,6-dienyl)-thio]-benzoic acid benzyl ester (boiling point=240° C./0.1 mm. Hg; $n_D^{24}$=1.5780).

Example 3

2 g. of p-[(3,7-dimethyl-octa-2,6-dienyl)-thio]-benzoic acid methyl ester are dissolved in 150 ml. of methylene chloride at 0° C. and treated dropwise with 1.28 g. of 10% by weight m-chloro-perbenzoic acid in 100 ml. of methylene chloride. The resulting mixture is allowed to stand at 0° C. for 15 minutes. It is subsequently successively washed with 2% by weight aqueous sodium sulfite solution, 10% by weight aqueous sodium bicarbonate solution and water, dried over sodium sulfate and evaporated under reduced pressure. The residual p-[(3,7-dimethyl-octa-2,6-dienyl)-sulfinyl]-benzoic acid methyl ester melts at 52°–53° C.

Example 4

Utilizing the procedure of Example 3:
p-[(3,6,7-trimethyl-octa-2,6-dienyl)-thio]-benzoic acid methyl ester is converted to p-[(3,6,7-trimethyl-octa-2,6-dienyl)-sulfinyl]-benzoic acid methyl ester (melting point=63°–64° C.);
o[(3,7-dimethyl-octa - 2,6 - dienyl)-thio]-benzoic acid benzyl ester is converted to o-[(3,7-dimethyl-octa-2,6-dienyl)-sulfinyl]-benzoic acid benzyl ester ($n_D^{24}$=1.5670).

Example 5

8 g. of p-[(3,7-dimethyl-octa-2,6-dienyl)-thio]benzoic acid methyl ester are suspended in 8 ml. of water. The suspension is heated with tetrahydrofuran until a clear solution is obtained. This solution is treated portionwise with stirring at 0°–5° C. with 5.2 g. of N-bromo-succinimide. The resulting mixture is stirred for 3 hours, then extracted with 200 ml. of diethyl ether. The ether extract is washed with water, dried over sodium sulfate and evaporated under reduced pressure. The residual crude bromohydrin is treated at room temperatue with a sodium methoxide solution prepared from 0.7 g. of sodium and 70 ml. of methanol, stirred for 5 hours, and exhaustively extracted with ether. The ether extract is washed with water, dried over sodium sulfate and evaporated under reduced pressure. The residual p-[(6,7-epoxy-3,7-dimethyl-oct-2-enyl)-thio]-benzoic acid methyl ester can be purified by adsorption on kieselgel; $n_D^{24}$=1.5580.

In Examples 6 and 7 hereinafter, which relate to tests demonstrating the activity of the phenyl derivatives provided by the invention, the various phenyl derivatives are referred to by way of the letters as indicated in the following list:

(A) p-[(3,7-dimethyl-octa-2,6-dienyl)-thio]-benzoic acid methyl ester
(B) p-[(3,6,7-trimethyl-octa-2,6-dienyl)-thio]-benzoic acid methyl ester
(C) p-[3,7dimethyl-octa-2,6-dienyl)-sulfinyl]-benzoic acid methyl ester
(D) p-[(3,6,7-trimethyl-octa-2,6-dienyl)-sulfinyl]-benzoic acid methyl ester
(E) p-[(6,7-epoxy-3,7-dimethyl-oct-2-enyl)-thio]-benzoic acid methyl ester.

Example 6

A cotton disc (10 cm.²) is sprayed with a solution of active substance in acetone. After drying, 30–60 freshly laid eggs of the meal moth (*Ephestia kuhniella*) are placed on the disc. The same is done with an untreated cotton disc and a cotton disc sprayed only with acetone. The discs are placed in a cage and kept at 25° C. and 90% relative humidity. The development of the eggs is registered over a period of a few days and the results are evaluated (100% egg mortality: no development of the embryos in the eggs laid on discs soaked with active substance).

RESULTS

| Active substance | Amount of active substance (g./cm.²) | Number of— | | Egg mortality (percent) |
|---|---|---|---|---|
| | | Eggs | Larvae | |
| A | $10^{-4}$ | 30 | 4 | 87 |
| | $10^{-5}$ | 35 | 18 | 49 |
| B | $10^{-4}$ | 29 | 18 | 38 |
| C | $10^{-4}$ | 39 | 6 | 85 |
| | $10^{-5}$ | 29 | 27 | 7 |
| D | $10^{-4}$ | 52 | 0 | 100 |
| E | $10^{-5}$ | 35 | 0 | 100 |
| | $10^{-6}$ | 45 | 0 | 100 |
| Control: | | | | |
| With acetone | | 50 | 50 | 0 |
| Without acetone | | 49 | 46 | 6 |

Example 7

A filter-paper strip (90 cm.²) is sprayed with a solution of active substance in acetone. After drying, 3–4 pairs of freshly moulted imagos of the cotton bug (*Dysdercus cingulatus*) are placed on the strip. The same is done with an untreated filter-paper strip and a filter-paper strip treated only with acetone. The development of the eggs laid daily is noted and the results are evaluated (100% egg-mortality: no development of the embryos in the eggs laid on filter-paper strips soaked with active substance).

RESULTS

| Active substance | Amount of active substance (g./cm.²) | Number of— | | Egg mortality (percent) |
|---|---|---|---|---|
| | | Eggs | Larvae | |
| A | $10^{-5}$ | 470 | 146 | 69 |
| D | $10^{-5}$ | 295 | 169 | 43 |
| E | $10^{-5}$ | 231 | 85 | 63 |
| Control: | | | | |
| With acetone | | 270 | 262 | 3 |
| Without acetone | | 410 | 390 | 5 |

We claim:
1. A compound of the formula:

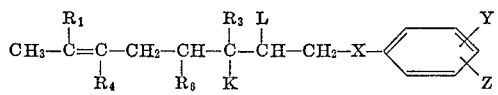

wherein $R_1$ is methyl or ethyl; $R_3$ is hydrogen, methyl or ethyl; $R_4$ is hydrogen or methyl; $R_6$ is hydrogen or lower alkyl; K and L are individually hydrogen, or taken together form a carbon to carbon bond; X is thio; Y is individually hydrogen, halogen, lower alkyl or lower alkoxy; is carboxyl, lower alkoxycarbonyl, aryloxycarbonyl, and aralkoxycarbonyl.

2. The compound of claim 1 wherein said compound has the formula

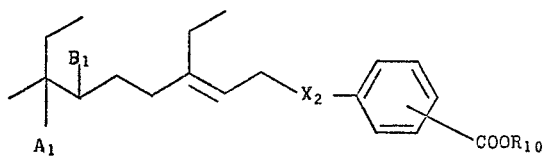

wherein $A_1$ taken together with $B_1$ form a carbon to carbon bond; $X_2$ is —S—; and $R_{10}$ is hydrogen, phenyl, phenyl-lower alkyl and lower alkyl.

3. The compound of claim 2 wherein $R_{10}$ is lower alkyl.

4. The compound of claim 3 wherein said compound is p-[(3-ethyl-7-methyl-nona-2,6-dienyl)-thio]-benzoic acid-methyl ester.

5. The compound of claim 1 wherein said compound is

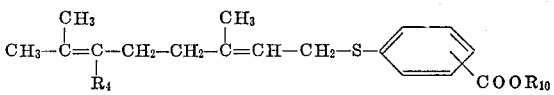

wherein $R_4$ is as above, and $R_{10}$ is hydrogen, phenyl, phenyl lower alkyl and lower alkyl.

6. The compound of claim 5 wherein $R_{10}$ is lower alkyl.

7. The compound of claim 6 wherein said compound is p-[(3,7-dimethyl-octa-2,6-dienyl) - thio] - benzoic acid-methylester.

8. The compound of claim 6 wherein the compound is p-[(3,6,7-trimethyl-octa-2,6-dienyl)-thio] - benzoic acid-methylester.

9. The compound of claim 5 wherein $R_{10}$ is hydrogen.

10. The compound of claim 9 wherein said compound is o-[(3,7-dimethyl-octa-2,6-dienyl)-thio]-benzoic acid.

11. The compound of claim 5 wherein $R_{10}$ is phenyl-lower alkyl.

12. The compound of claim 11 wherein said compound is o-[(3,7-dimethyl-octa-2,6-dienyl)-thio] - benzoic acid-benzylester.

References Cited
FOREIGN PATENTS 436,256   11/1967   Switzerland _____ 260—609

LORRAINE A. WEINBERGER, Primary Examiner

R. GERSTL, Assistant Examiner

U.S. Cl. X.R.

260—327 E, 348 A, 348 R, 468 R, 514 R, 515 M, 516, 521 R, 544 L, 544 M, 598, 240 R, 599, 654 R; 424—275, 278, 308, 317